UNITED STATES PATENT OFFICE.

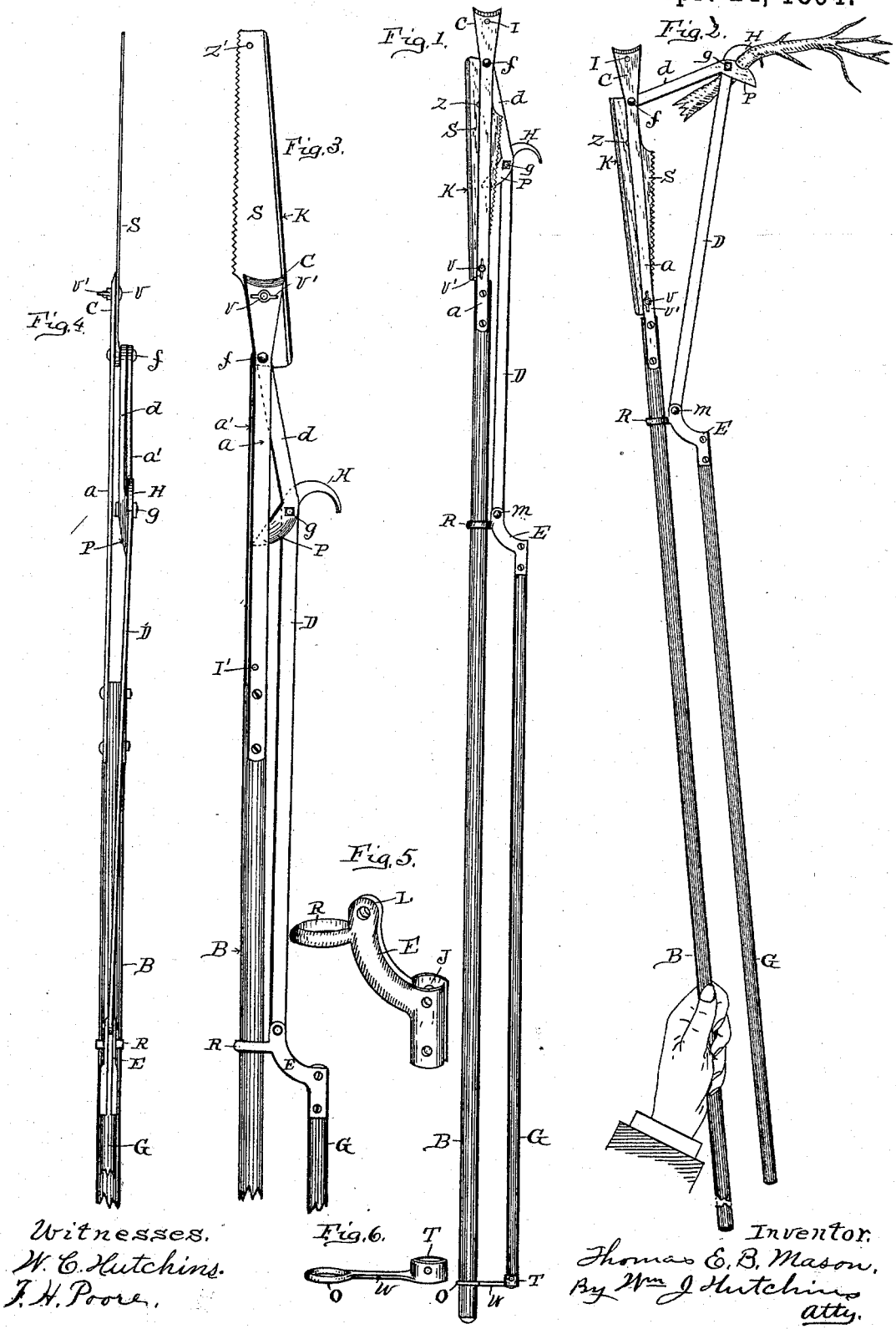

THOMAS E. B. MASON, OF SHENANDOAH, IOWA.

PRUNING IMPLEMENT.

SPECIFICATION forming part of Letters Patent No. 518,649, dated April 24, 1894.

Application filed January 23, 1893. Serial No. 459,369. (No model.)

*To all whom it may concern:*

Be it known that I, THOMAS E. B. MASON, a citizen of the United States of America, residing at Shenandoah, in the county of Page and State of Iowa, have invented certain new and useful Improvements in Pruning Implements, of which the following is a specification, reference being had therein to the accompanying drawings and the letters of reference thereon, forming a part of this specification, in which—

Figure 1. is a side view of the implement, as it would appear ready for service; Fig. 2. a similar view of the same, as it would appear when in service; Fig. 3. a side perspective of the upper portion of the implement, having the saw blade thereof extended, as it would appear ready for service; Fig. 4. a view of the same, taken to show the edge of the said saw blade and other parts of the implement, and Figs. 5 and 6, are detail perspectives of parts serving as guides for the auxiliary handle of the implement.

This invention relates to certain improvements in a combination pruning implement, and consists in the specific construction and arrangement of parts, which are fully set forth and explained in the following specification, and pointed out in the claim.

Referring to the drawings B represents the principal or main handle of the implement, and G an auxiliary handle which is connected with said main handle through the agency of the guides E and W.; the guide E having perforated plates J (see Fig. 5.) which are secured to the upper end of handle G by means of rivets or bolts, as shown, and also having a loop R which is sleeved to slide on handle B, and the guide W having a socket T into which the lower end of handle G is stepped, and a loop or ring O which is sleeved to slide on handle B; which manner of connection of said handles permits a parallel longitudinal movement of either handle independent of the other; however if desired the guide W may be omitted and the position of the lower end of the handle G maintained by the hands of the operator.

$a$ and $a'$ represent a pair of metal arms jointly bolted, at their lower end portion, to the upper end of handle B, as shown, thus extending beyond said handle; one of said arms $a$ being made to extend beyond its fellow arm, and shaped, at such extension, to form a chisel C which terminates with a cutting edge as shown.

D represents a bar terminating at its upper end with a hook H and pivotally secured, at its lower end, between a pair of ear lugs L of guide E, by means of a cross rivet which is arranged in corresponding holes of both said bar and lugs, and $d$ is an arm pivotally supported, at one end, between arms $a$—$a'$, at the extending end of arm $a'$, on a cross rivet or bolt $f$, and jointed with bar D. at the opposite end portion, and at the junction of hook H by means of the stud or bolt $g$, and terminates at that end with a shear cutter P adapted, when operated, to shear with the hook H.

S represents a saw blade secured at one end between said arms $a$—$a'$ by means of the cross-rivet or bolt $f$, by passing said rivet or bolt through a hole of the blade, as shown, and is made with a knife edge along its back as shown at K, and is further provided with two perforations Z and Z'. The manner in which said saw blade is connected with arms $a$—$a'$ adapts it to fold between said arms, as represented in Figs. 1 and 2, which brings the end perforation Z' to register with a corresponding perforation I' of arm $a$, and when in such position a small bolt V is placed through said perforations and has a thumb nut V' turned thereon, which secures the blade in such position, so the knife edge K thereof, as it extends from between arms $a$—$a'$, may be brought into service in clearing small branches, twigs and the like from a tree, when such branches or twigs, are of such nature as not to be readily cut by an upward movement of the chisel C, which chisel is, at such position of the saw blade, free for service to cut small branches and limbs from a tree. When it is desired to bring the saw into service, to remove large limbs or dried small limbs from a tree, the nut V' and bolt V are removed to release the saw blade end, when the said blade is turned from between arms $a$—$a'$ to extend at the side of the chisel C, as represented in Figs. 3 and 4, which position brings the blade perforation Z to register with a corresponding perforation I of the chisel, and as a means of securing such position the bolt V is placed through said perforations and the nut V' turned thereon to lock the blade close to the chisel, and in such capacity the chisel serves as an arm for the holding of the saw blade, and when the blade is in such position either its saw or knife edge K may be brought into service.

In use, when utilizing the hook H and the shear cutter P, the implement is grasped by handle B only, and when raised to its work the weight of the auxiliary handle and the bar D and arm $d$ will cause such parts to lower their full limit, as represented in Fig. 1, and with the parts in such position the hook H is free to be hooked over a limb, when by a downward movement the arm $d$ will be caused to operate and bring the shear cutter into action to sever the limb adjacent the hook as represented in Fig. 2. When the limb is severed and the hook dislodged the weight of the parts $d$, D. G automatically brings them to the position represented in Fig. 1. ready for another like operation. In instances where the limb or branch, being severed, is not sufficiently strong to withstand the necessary strain without bending too far, it becomes necessary to hold the handle G from down movement, with one hand, while with the other hand the handle B is moved down.

The object in providing the implement with the appendages described, is, to adapt it to all the various modes of pruning.

Having thus described my invention, what I claim as new and useful, and desire to secure by Letters Patent, is as follows:

The combination pruning implement comprising the handles B and G; the guide E carried by said handle G; the bar D provided with the hook H, and the arm $d$ provided with the blade P, and pivoted to said bar, and adapted to be operated by said handle G; the arms $a—a'$ fixed to said handle B and pivotally connected with said arm $d$; one of which terminating in the chisel C, and provided with the saw blade S adjustably fixed thereto, substantially as and for the purpose specified.

THOMAS E. B. MASON.

Witnesses:
WM. J. HUTCHINS,
F. H. POORE.